Inventors
Peter J. Mayer Jr.
Arthur C. Mueller
By Barry L. Clark
Attorney

Aug. 17, 1965          P. J. MAYER, JR., ETAL          3,201,798
                    LOOP FORMER IN SHORT GATE CAMERA
Filed Feb. 20, 1963                                3 Sheets-Sheet 3

Inventors
Peter J. Mayer Jr.
Arthur C. Mueller
By Barry L. Clark
Attorney 3,201,798
LOOP FORMER IN SHORT GATE CAMERA
Peter J. Mayer, Jr., Chicago, and Arthur C. Mueller, Niles, Ill., assignors to Bell & Howell Company, Chicago, Ill., a corporation of Illinois
Filed Feb. 20, 1963, Ser. No. 259,961
7 Claims. (Cl. 352—159)

The present invention is directed to improvements in motion picture cameras employing film magazines and is more particularly directed to an improved means for intermittently feeding film through a camera having a short film gate.

In a conventional motion picture camera, film is fed from a feed spool through a film gate where it passes in front of the exposure aperture and thence to a takeup spool or spindle. A drive is provided to constantly rotate the takeup spindle during camera operation and a shuttle or its equivalent is employed at the film gate to effect intermittent pull-down of film through the gate and past the exposure aperture.

It will be understood that while the take-up spindle rotates constantly during camera operation, a constantly slipping clutch is employed between the motor and spindle so that the spindle rotating speeds will decrease as film builds up thereon as is well understood in the art. It will be appreciated that the film strip at the exposure aperture must remain absolutely motionless during the interval in which the camera shutter has uncovered the exposure aperture to expose a film frame even though the constantly moving takeup spindle is acting to take up the film slack between the gate and the takeup spindle.

There have been several techniques devised to prevent the movement of film in the gate while the film is being exposed. One such technique is to provide a spring loaded pressure plate under which the film must pass. The pressure plate can be loaded to a degree sufficient to prevent objectionable movement of film within the gate during the exposure interval. It will be appreciated that the pressure plate loading solution requires that a significant spring load be applied to the plate to prevent slippage of film in the gate during that interval when the gate-carried film is motionless and the takeup spindle is taking up film slack in the run between the gate and the takeup spindle.

In fact, such a solution, even in a long gated camera, is not entirely satisfactory. The pressure plate loading requires that the camera motor expend considerable power in driving the film moving shuttle mechanism. Such an increased power requirement is obviously best met by gearing down the motor and while this solution in turn satisfactorily solves the immediate problem, it too is beset with other seemingly irresoluable and objectionable characteristics. Such a motor gear-down materially reduces the film footage which can be run on a given motor winding.

The camera illustrated in the appended drawings employs a removable magazine and, due to camera spatial requirements, has an unusually short film gate. It will be appreciated that while there is nothing inherently inferior about a short film gate from a film exposure standpoint, the problem of preventing movement of film within the gate during a film exposure interval is increased proportionally as the length of the gate decreases.

The gate mechanism which we have devised not only obviates the above noted problems but provides a good many advantages not found in previous gate mechanisms. Our short gate camera utilizes what is termed the pinch-bar effect to insure that undesired film movement within the gate will not take place. The exit end of the film gate is provided with a sharp, squared or substantially square corner or edge which is positioned in a manner such that film leaving the gate will tend to bend or crimp slightly around the squared corner when the shuttle has completed its film pull-down run and the take-up spindle is taking up film slack between the takeup spindle and the gate. In fact, the squared corner is so positioned relative to the exposure aperture that the film will break around the corner precisely at a point in the film where the center of a film perforation is formed. In this manner, film crimping or bending takes place readily at the squared corner because the film is relatively weak at those points along its length where the film perforations are formed.

The type of camera in which our invention finds particular utility is that which employs a reversible magazine. A reversible magazine might, for instance, be employed in an 8 mm. camera so that at the end of the usual 25 foot film run the magazine can be removed bodily from the camera, flipped over end for end on itself, and returned to the camera for exposure of the second half of the film.

It will be appreciated that in such a reversible magazine camera, the film contained within the magazine will eventually move in each of two directions before it is completely exposed and that the gate must be adapted to pass film through in each of two directions. Obviously, if the pinch bar effect is to be employed to prevent undesired film movement in a gate of this character, then the sharp edge or square corner must be provided at each end of the gate because what is at once the entrance end of the gate will later become the exit end of the gate and vice versa.

In order to prevent the film from bending on the squared corner at the entrance end of the gate, we provide a device for kicking up a relatively large loop of film between the feed spindle and the gate just prior to a film pull-down shuttle cycle so that the film will move smoothly past the entrance corner. This device takes the form of a simple free floating rod mounted within the magazine in a manner such that each end of the rectilinearly movable rod contacts a run of film adjacent each end of the gate. As a consequence of this arrangement, film slack takeup between the gate and the takeup spool will cause the rod to move in such a manner as to kick up film slack at the opposite or entrance end of the gate and such action, it will be observed, necessarily just precedes a film pull-down cycle of the shuttle.

It is therefore a principal object of our invention to provide a gate mechanism for a motion picture camera which, without alterations or external aid, is capable of passing film through itself in either direction.

Another object of our invention resides in the provision of a gate of the type generally described in the preceding paragraph which employs the pinch-bar effect to prevent movement of film within the gate during the film exposure interval.

These and other objects, advantages, and features of our invention will become apparent from time to time as the following specification proceeds and with reference to the accompanying drawings, wherein:

Figure 1:
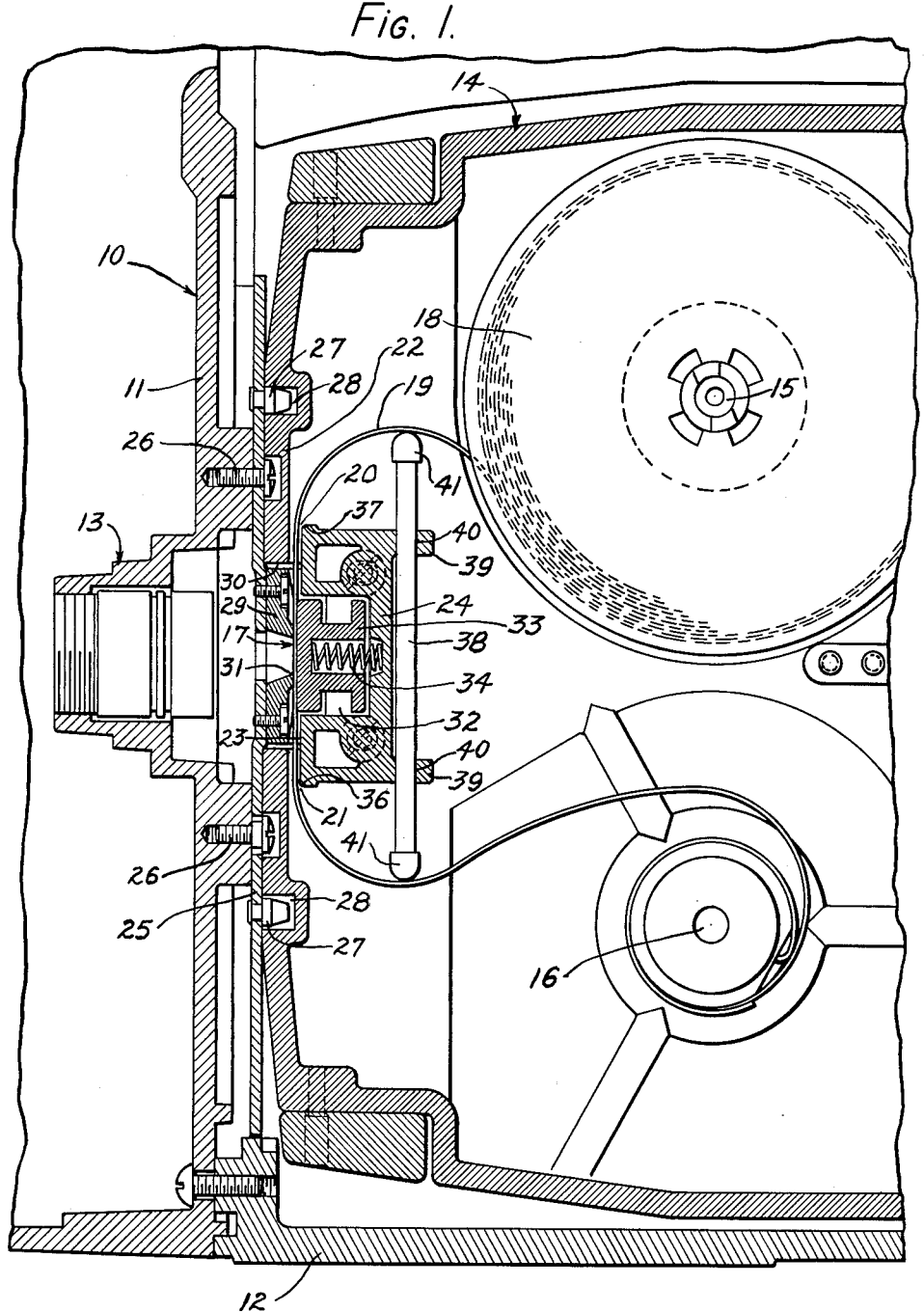
FIGURE 1 is a fragmentary view in elevation and partly in cross-section, fragmentarily illustrating a camera having a film magazine mounted therein.
Figure 2:
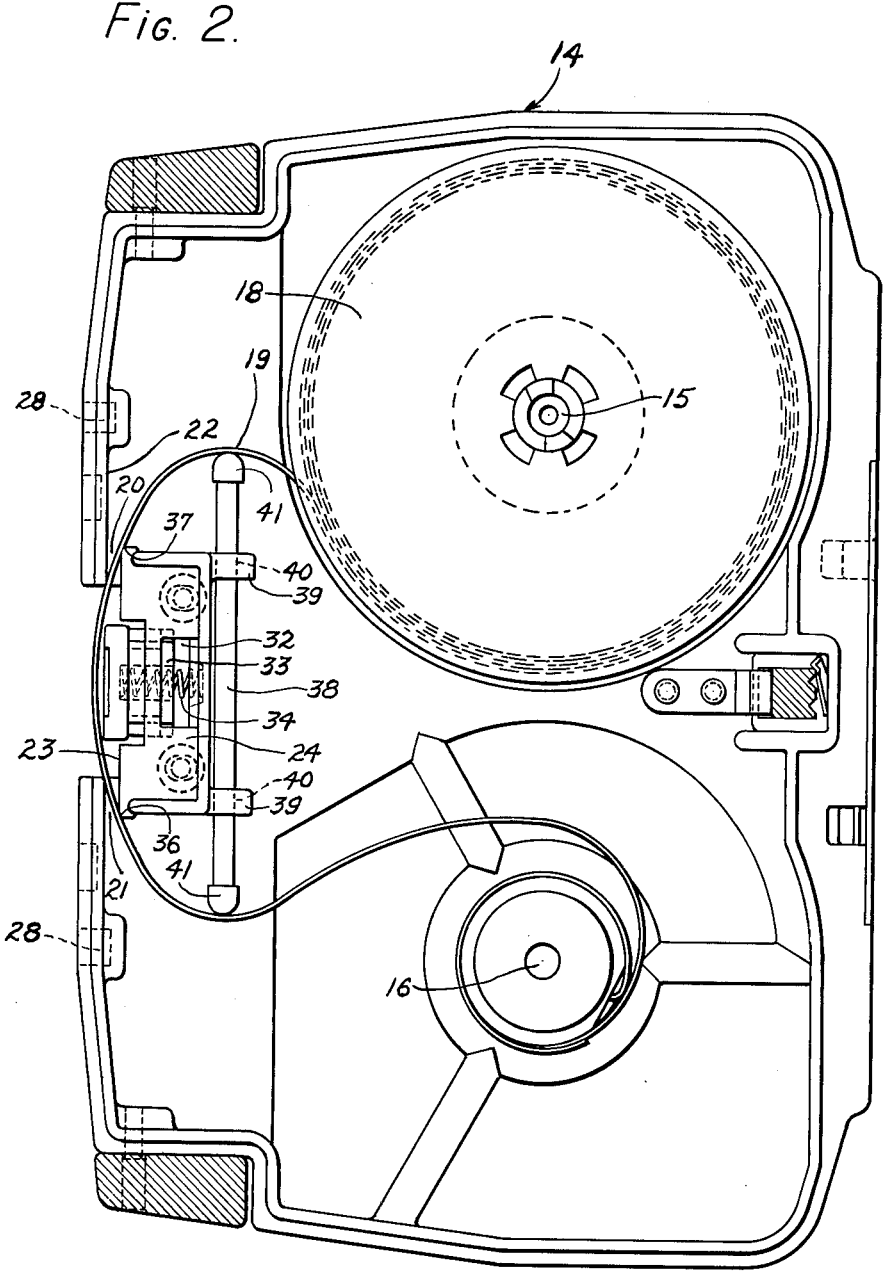
FIGURE 2 is a side elevational view, partly in cross-section, illustrating the film magazine per se.

Referring initially to FIGURE 1, a camera 10 is shown as having outer walls 11 and 12 and a lens barrel 13. A magazine 14 is removably mounted within the camera 10 and has feed and takeup spindles 15 and 16 mounted therein in spaced relation from one another and rearwardly of a film gate 17.

A film spool 18 is mounted on feed spindle 15 and as film 19 moves from spool 18 to the gate 17, it passes through an entrance channel 20 and, as it moves from the gate 17 to the takeup spindle 16, it passes through an exit channel 21, both of these channels being formed by the rear surface of the front wall 22 of the magazine 14 and the forwardly facing surface 23 of the film pressure plate mounting block 24.

The front outer wall 11 of the camera has an inner plate 25 secured thereto by the bolts 26. Riveted to plate 25 are rearwardly protruding locating pins 27 which enter recessed sockets 28 formed in the front wall 22 of the magazine for accurately locating the magazine 14 within the camera as shown in FIGURE 1.

When the magazine 14 is properly located within the camera, a boss 29 fastened to and protruding rearwardly from the plate 25 enters an opening 30 in the front wall 22. At the rear surface of the boss 29, an exposure aperture 31 is formed therein which is centered on the optical axis of the lens barrel 13. A well 32 within the mounting block 24 receives a pressure plate or shoe 33 which is spring biased outwardly of the well by a light compression spring 34. The pressure plate 33 provides no substantial restraining force to the movement of the film through the gate 17 but does insure that film within the gate will be held flat and snugly against the rear surface of the boss 29 at the exposure aperture 31 to insure proper exposure thereof.

It will be appreciated that the film is moved through the film gate 17 in intermittent steps in synchronism with movement of the camera shutter (not shown) by shuttle teeth 35 which are moved through a generally rectangular motion in a manner not shown and fit within the film perforations to pull the film through the gate. It will also be appreciated that while film is being pulled intermittently through the gate 17, the takeup spindle 16 is revolving at a constant speed under the influence of the camera motor. The manner in which drive from the motor to the takeup spindle 16 within a removable magazine is effected is understood by those adept in this art and so is not here further explained.

Figure 3:
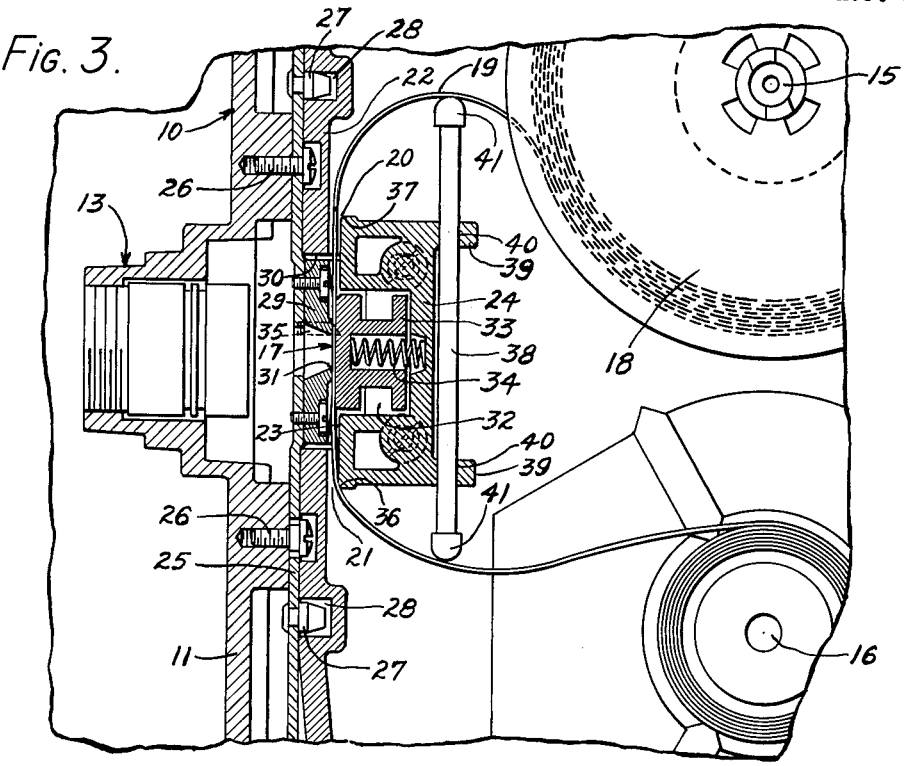
FIGURES 3 and 4 are fragmentary side elevational views similar to FIGURE 1 and showing in particular, the gate mechanism in different operating positions.
Figure 4:
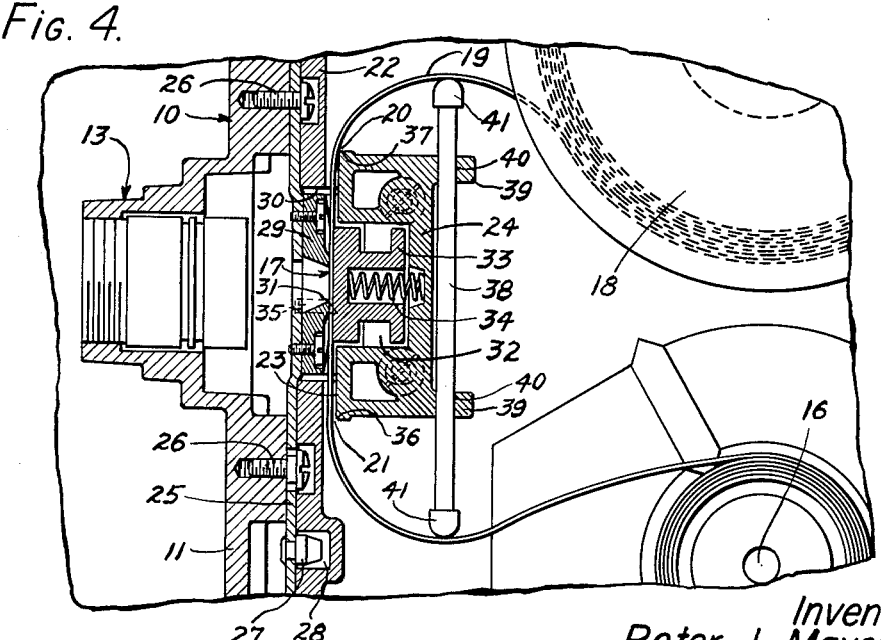

In order to insure that slack takeup in the run of film between the gate 17 and spindle 16 will not cause undesired movement of the film within the exit channel 21 when that film is momentarily motionless for exposure purposes, the pressure plate mounting block 24 has a squared corner or sharp edge 36 at the lower end of exit channel 21 so positioned with respect to the axis of the spindle 16 that film leaving the gate 17 for takeupon the spindle 16 will tend to bend or crimp slightly (FIG. 3) around the squared corner when the shuttle has completed its film pulldown run and slack has been taken up between the gate and the takeup means.

The squared corner 36 is so spaced from the exposure aperture 31 that the film will break around the corner precisely at a point in the film where a film perforation is formed. As has earlier been pointed out, the film is relatively weak in its transverse dimension at this point and hence will crimp much more readily than it would if means were provided to crimp the film between, rather than at, the film perforations.

The squared corner provides what has been above referred to as the pinch-bar effect which insures that slack takeup in the film run between the gate and the takeup spindle will not cause movement of the film within the exit channel 21. The squared edge at the upper end of entrance channel 20 in FIGURE 1 is labeled 37.

It will be appreciated that the camera illustrated in the appended drawings is so arranged that the magazine 14 can be turned over end for end after 25 feet of film have been run so that the film can be run back in a reverse direction. Since the film gate is symmetrical either side of the optical axis, the squared corner 36 will, in the flipped-over position of the magazine, be positioned at the entrance end of the gate rather than at the exit end thereof. In order to prevent the film from binding on the squared corner at the entrance end of the gate, there is provided a loop forming rod 38 for the purpose of kicking up a large loop of film above the gate. This enlarged film loop tends to straighten out the film prior to its entrance into the gate and thus effectively obviates any problem of binding at the gate entrance.

A pair of rearwardly extending supports 39 are formed integrally with the pressure plate mounting block 24 and have aligned apertures 40 formed therein which are adapted to slidably receive the loop forming rod 38. As shown in the drawings, the rod 38 is of longer length than the block 24. The rod 38 is of such a length that when slack has been taken up in the film run between the gate and the takeup spindle and the lower end of the rod is engaging that film run, the upper end of the rod will engage and form a loop in the film run between the gate and the feed spindle, so as to prevent the film binding at the gate entrance in the manner best illustrated in FIGURE 3. Curved buttons 41 are formed on the tip ends of the rod 38 of a material which will slide easily on the film and not injure the same. For example, the rod illustrated in the drawings may constitute a synthetic material such as a lightweight plastic molded as an integral member.

It will be appreciated that when the camera is run, the loop forming rod 38 vibrates up and down rapidly and is effective to pull off film from the feed spindle to form an enlarged loop in the film run above the gate just prior to each film pull down stroke of the shuttle to make the camera run free and prevent film binding in the squared corner at the entrance of the film gate. Because the rod vibrates rapidly during its operation, it will be understood that the opposed ends of the rod may not always be in contact with a film run. Because of the vibratory movement of the rod, film may actually be kicked in one direction or another.

The combination of the unusually short film gate and the loop forming rod provides several distinct advantages over prior types of gate mechanisms. First, the short film gate insures that the film behind the exposure aperture will be held absolutely flat. In the usual long gated camera, the film track is so long that the film tends to curl somewhat at the exposure aperture and it takes somewhat of a wavy form in the track. In our short gated camera the film has its curl flattened for such a short portion of its length that this characteristic of prior types of devices is not really a problem. A very lightly biased pressure issuing holds the film absolutely flat at the aperture.

Still further, the short film gate satisfies limited spacial requirements. As has already been pointed out, the combination of a gate and rod provides a very satisfactory means of preventing film movement at the gate during exposure.

It is important to understand that the loop forming rod provides a very freely running camera because it so orients the film that the shuttle must work only to pull film from the enlarged loop above the gate and does not have to pull film around a gate corner directly from the feed spool. The loop forming rod thus has considerable utility in a camera mechanism in making the camera run freer completely apart from the function it serves in combination with a short square corner gate.

It will be appreciated that the loop forming rod could be enclosed in a camera not having a short square cornered gate and that it could be designed so as to act as a snubber at the lower end of the gate in addition to its function as a loop forming member.

It will be understood that this embodiment of our invention has been used for illustrative purposes only and that various modifications and variations in our invention may be effected without departing from the spirit and scope of the novel concepts thereof.

We claim as our invention:

1. In a motion picture camera including an exposure aperture,
   film supply and take-up means,
   film gate means,
   film moving means for continuously taking up film at said film take-up means,
   shuttle means for intermittently pulling film through said film gate means,
   the improvement which comprises a loop forming rod,
   means freely slidably mounting said rod within said camera and between said film gate means and said film supply and take-up means to normally simultaneously position said rod in engagement with runs of film adjacent the entrance and exit ends of said film gate means,
   said loop forming rod having a length substantially greater than the length of said gate means,
   whereby slack take-up at the film run adjacent the exit end of said gate means will act to cause said rod to form a film loop ahead of the entrance end of said gate means.

2. In a motion picture film magazine for a camera using film of the size in which only half of the film is exposed at a particular instant, said film magazine comprising:
   a casing,
   a film supply means,
   a film take-up means,
   a pressure plate disposed on a side of said magazine between said supply means and said take-up means and adapted to cooperate with an aperture plate in said camera to form a film gate,
   a mounting block for mounting the pressure plate in the path of the film,
   said mounting block having a film entrance end and a film exit end,
   said film entrance and film exit each having a substantially square corner,
   a freely floating rod mounted rearwardly of said pressure plate and extending between the runs of film entering and leaving the region of said pressure plate,
   said rod being longer than said mounting block and positioned to spread the runs of film entering and leaving the region of said pressure plate,
   said rod being adapted to be intermittently moved from a position near the film exit end toward a position near the film entrance end,
   said intermittent movement being imparted by engagement with a film as the film is taken up on the take-up means,
   said rod being further adapted when moved toward said film entrance end to engage a run of film passing from the supply means to the film entrance end to form a loop in the film,
   said casing being constructed so as to be reversible within said camera,
   whereby reversing the position of said casing interchanges the position of said film entrance and film exit relative to said camera.

3. In a motion picture device in which a film is passed from a supply means, through a film gate means by the intermittent operation of a shuttle means, and then to a continuously operated take-up means, the improvement which comprises:
   a freely movable rod mounted behind said film gate and extending between the run of film entering said film gate means and a run of film leaving said film gate means,
   said film gate means having a film entrance and a film exit,
   said film entrance and film exit each having a substantially square corner past which said film must move when entering or leaving said gate means,
   said movable rod being moved upward by movement of said film when the slack in said film run between said film exit and said take-up means is taken up,
   said upward movement of said movable rod paying out a loop of film from said supply means,
   whereby when said shuttle pulls said film through said gate means, said loop in said film assures that said film moves freely past said square corner at said gate means entrance.

4. Film transporting apparatus comprising first and second spindles for taking up and supplying a film strip,
   film gate means through which the film strip is transported in a film plane,
   said film gate means including a mounting block having substantially squared shoulders disposed in spaced relation to one another in a plane substantially in the film plane to guide the film into and out of the film plane and permit the film to be slightly crimped as it leaves the film plane to be taken up by the take-up spindle, and
   a reciprocal rod freely movable by the film strip and mounted between said film gate means and said first and second spindles and having portions projecting beyond said shoulders to engage the film to maintain spaced film loops adjacent the shoulders, while preventing crimping of the film over both shoulders simultaneously.

5. The film transporting apparatus of claim 4, wherein said reciprocable rod is mounted for movement along a track in said mounting block, said track being formed in said block behind said film plane.

6. The film transporting apparatus of claim 4, wherein said reciprocable rod has rounded tips formed on the ends thereof, said tips having a diameter greater than the diameter of said rod.

7. In a motion picture camera including
   an exposure aperture;
   film supply and takeup means;
   film gate means including a pressure plate mounting block;
   film moving means engageable with film in the gate means for effecting intermittent film feed through said gate means and continuous film takeup at said film takeup means, the improvement which comprises:
   squared corners formed on said block to form entrance and exit ends for said gate means in the path of movement of film passing from said supply to said takeup means;
   a rod freely slidably positioned behind said film gate means and having a first end portion projecting beyond said block for enegagement with the run of film adjacent the entrance end of said gate means to form a loop of film ahead of said gate means;
   said rod having a second end portion projecting beyond the block for engagement with the run of film adjacent the exit end of said gate; and
   said second end portion and said rod being adapted to be periodically moved toward said entrance end by movement of the film passing from the gate means to the takeup means just prior to the movement of the film through the gate means by the film moving means.

References Cited by the Examiner

UNITED STATES PATENTS

| 629,582 | 7/99 | Mason | 352—117 |
| 1,914,214 | 6/33 | Porter | 352—78 |
| 2,039,906 | 5/36 | Howell | 352—194 X |
| 2,231,665 | 2/41 | Fairbanks | 352—78 |
| 3,021,039 | 2/62 | Michaels | 352—159 X |

JULIA E. COINER, *Primary Examiner.*